United States Patent [19]

Rutledge et al.

[11] Patent Number: 5,696,535
[45] Date of Patent: Dec. 9, 1997

[54] GRAPHICS DISPLAY POINTER WITH INTEGRATED SELECTION

[75] Inventors: Joseph Dela Rutledge, Mahopac, N.Y.; Edwin Joseph Selker, Palo Alto, Calif.

[73] Assignee: International Business Machines Corporation, Armonk, N.Y.

[21] Appl. No.: 340,935

[22] Filed: Nov. 17, 1994

[51] Int. Cl.$^6$ .................................................. G09G 5/00
[52] U.S. Cl. ............................................ 345/156; 345/161
[58] Field of Search .............................. 345/156, 157, 345/158, 159, 161; 273/148 B, 438; 74/471 XY; 200/6 A

[56] References Cited

U.S. PATENT DOCUMENTS

| | | | |
|---|---|---|---|
| 4,879,556 | 11/1989 | Duimel | 345/161 |
| 5,012,231 | 4/1991 | Felsenstein | 345/161 |
| 5,448,261 | 9/1995 | Koike et al. | 345/156 |

Primary Examiner—Richard Hjerpe
Assistant Examiner—Regina Liang
Attorney, Agent, or Firm—Whitham, Curtis, Whitham & McGinn; Stephen C. Kaufman, Esq.

[57] ABSTRACT

A threshold discrimination filter circuit compares an amplitude and rate of change of amplitude of an output of a graphic input device such as an isometric joystick including strain gauges and a fixed resistance in a hierarchical voltage divider with threshold reference signals and corrects the output of the graphic input device based on previously stored samples thereof when a selection or deselection action by a user is discriminated. Outputs of the graphic input device are supplied directly to a CPU of a data processing device between masking periods so that graphic manipulations such as dragging can be performed while masking unintended change of specified display location during selection and deselection.

19 Claims, 1 Drawing Sheet

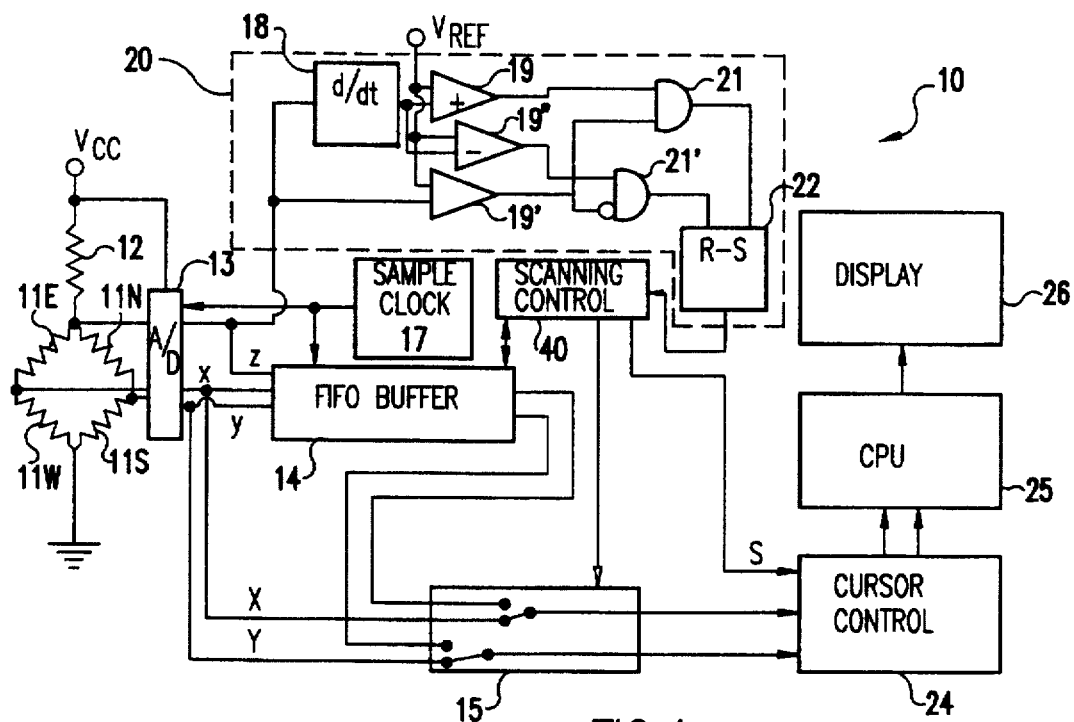
FIG. 1
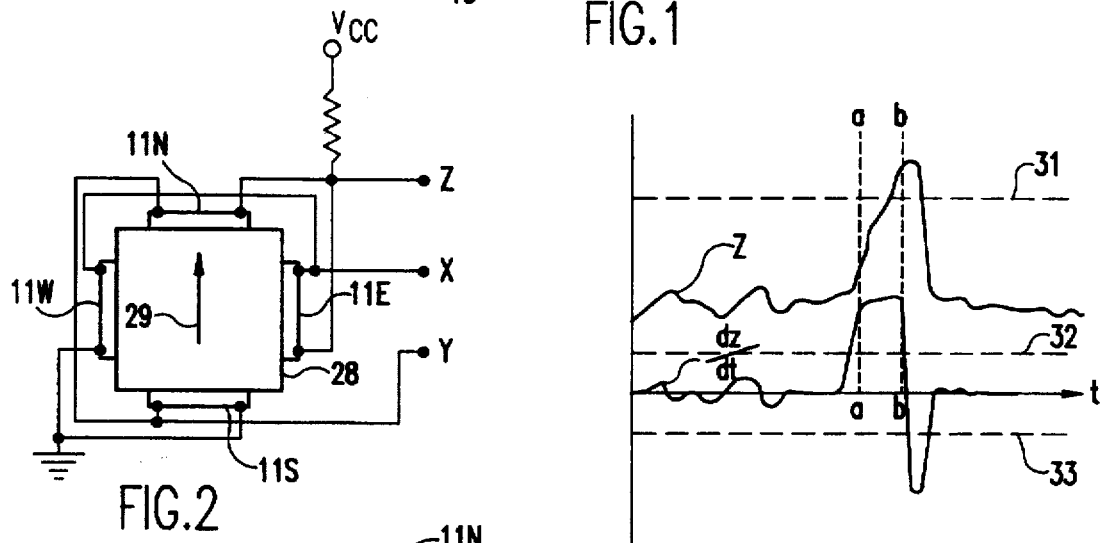
FIG. 2
FIG. 3
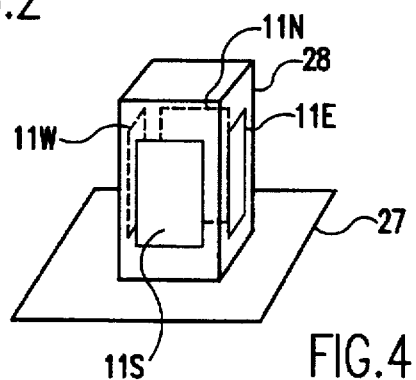
FIG. 4

GRAPHICS DISPLAY POINTER WITH INTEGRATED SELECTION

BACKGROUND OF THE INVENTION

1. Field of the Invention

The present invention generally relates to graphical pointing devices for indicating locations on a display such as cursor controllers and, more particularly, to devices capable of pointing to and/or selecting locations on a display and/or manipulating displayed images such as icons or other indicia which may be displayed at such locations.

2. Description of the Prior Art

In the field of computers and data processors, it has long been recognized that the capability of a user to receive and assimilate information in order to interact easily with the computer is of major importance in the usefulness of the computer in many applications. The utility of increased "computing power" to execute programs at ever increasing speeds diminishes in all but a relatively few highly complex programs which require only slight interactivity with a user when the user cannot readily perceive, understand and react to the results thereof. Therefore, the interest in and dedication of a significant fraction of available computing power to the user interface has become a widely accepted practice for both hardware and software design in the data processing field. In recent years, it has also been found that displayed graphics images, especially if manipulable by the user, provide a particularly good medium for both the communication of information to the user including processor and program execution status and for the input of user control information and data.

Input of control signals and data through the medium of a graphic display requires the use of a device by which a location on the display may be specified and a separate mechanism for selection. This latter requirement is imposed by the requirement of positional feedback to the user by display of a cursor, icon or the like so that the operator can control the specification of a location without inputting of data or exercising control until the location is correctly specified. In the past, this has been accomplished with various devices which have become well-known and which are in widespread use, such as the mouse, light-pens, trackballs (essentially an inverted mouse which does not meed to be moved across a surface), gimballed and isometric joy-sticks and many special purpose arrangements such as adaptations to accommodate various physical disabilities of the user which will hereinafter be referred to collectively as graphic input devices. Typically, these devices will include one or more buttons (e.g. the well-known one-, two-, or three button mouse) or switches by which a control function can be effected once a location on the display has been correctly specified to the user's satisfaction. Occasionally, a mechanism such as a treadle switch is employed which is entirely separate from the apparatus used to specify a location on the display. In any event, both types of control (e.g. location and selection) must be provided.

In recent years, there has been not only a trend toward miniaturization and portability of data processing devices but also toward ergonomic design and "human engineering" so that the devices may be operated in a manner which may be more familiar to a user. A major difficulty with miniaturization is the size of input devices, such as a keyboard which rapidly become less acceptable as size is diminished. This need for smaller input arrangements has led to the development of so-called pen computers in which data may be entered by an act similar to writing on paper in a notebook. For the same reason, trackball devices which may be included in the housing of the portable computer and do not require a separate surface for operation by a user are often included. More recently, isometric joysticks which do not significantly move but control cursor motion in response to force applied thereto have appeared in commercially available devices.

Regardless of the degree of miniaturization which may be possible, the requirement of separate means to provide the separate functions alluded to above requires separate space which must be compatible with the physical size of a user. Therefore miniaturization is limited by this practical limitation which is independent of any design feature of the data processing device itself. The only alternative to the provision of separate controls is to combine the functions of devices which sense the user's actions. When this is done, separation of functions is difficult.

For example, if a pressure or force sensor is included in a stylus-like position control device, such as a light pen or joy-stick, alteration of force during normal motion over the display often causes unintended selection even though a separate sensor on an axis orthogonal to other sensors is provided. Conversely, the user's action in changing force applied against the devise usually causes small but often significant change in the location specified. These problems are generally associated with the fact that a stylus will not often be naturally or comfortably held in a position in which its axis is perpendicular to the display. For example, a correction technique for use with a light pen or touch screen where positional errors were caused by lifting of the pen (for selection only) in a direction not precisely orthogonal to the display screen is disclosed in U.S. Pat. No. 4,558,313 To Garwin et al., which is hereby fully incorporated by reference. This latter difficulty is also characteristic of the well-known gimballed joystick (which is not likely to be in a neutral or "vertical" position when a location is being specified) or a mouse in which the natural stroke of a finger on a button is not perpendicular to the surface on which it is moved (or, alternatively, the stroke of the button motion is inclined in the interest of a more natural feel to the user).

These problems in the practical use of graphical input devices have proven quite intractable, particularly as increased degrees of miniaturization have been attempted. Further, attempts to facilitate or enhance separation of functions by sensing of force, with or without electronic processing of the transducer output, has met with little success due, at least in part, to the differences in force applied by different users in the comfortable actuation of the device and/or variation in the nature of actions by even a single user. For example, the amount of force applied to a stylus by a user may vary greatly with stress: when successful tracking of position is not being achieved, it is a natural reaction to increase force of the stylus against the display, even though the degree of force already applied may be the reason for incorrect tracking.

All electronic processing of signals from transducers in graphic input devices attempted in the past for detection of selection has also been complicated by the need to accommodate sensing of a change in location specified by the user during periods of selection for common display manipulations such as "dragging" of an object. During such operations, the signals from the transducers must necessarily change because of the operator manipulation for positional input. These signal variations may complicate the detection of selection and deselection. Further, force applied to a stylus or selection button by an operator may vary widely (due, for example, to irregularities in the surface over which the pointing device is moved or as an incident of the changing positional input by the user) and rapidly while applied force remains relatively high. Accordingly, such operations have been difficult without the provision of separate selection and position input arrangements.

SUMMARY OF THE INVENTION

It is therefore an object of the present invention to provide a reliable method and apparatus for detecting a "selection push" in a graphical input device which integrates positional and selection input functions.

It is another object of the invention to provide a method and apparatus for specifying and selecting a position on a graphic input device in which the selection function does not disturb the location specified.

It is a further object of the invention to provide a method and apparatus for automatically canceling unintended effects in the operation of a graphic input device by a user.

It is yet another object of the invention to provide for the achievement of the above objects while allowing for change of position selection during selection such as for dragging of objects on the display.

It is a yet further object of the invention to provide an apparatus and method for reliably separating location specification and selection functions in a graphic input device utilizing transducers which are common to both functions.

In order to accomplish these and other objects of the invention, a graphic input arrangement is provided including a cursor control circuit, an arrangement for developing first, second and third respective signals corresponding to force applied to a graphic input device in any of three orthogonal axes and supplying at least two of said first, second and third signals to the cursor control circuit, a buffer for storing at least one of said first, second and third signals, a comparison arrangement including a first comparator for comparing an amplitude of at least one of the first, second and third signals to a reference value and providing a first output, a second comparator for comparing a rate of change of amplitude of at least one of the first, second and third signals to a reference value and providing a second output, and an arrangement responsive to the first and second comparators for supplying correction values based on values stored in the buffer to the cursor control circuit.

In accordance with another aspect of the invention, a method of controlling an image on a display is provided including the steps of storing samples of an output of a graphic input device, discriminating occurrences of selection and deselection of a location with a graphic input device, and generating corrections to the output of the graphic input device based on stored samples of an output of the graphic input device surrounding occurrences of selection and deselection.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a schematic diagram of an exemplary transducer and signal processing circuit preferably employed in the invention, FIG. 2 is an axial cross-section in schematic form of the graphic input device in accordance with a preferred embodiment of the invention, FIG. 3 is a graphic depiction of the signal processing performed on the transducer output signals in accordance with the exemplary circuit of FIG. 1, and FIG. 4 is a perspective view of a preferred embodiment of the invention.

DETAILED DESCRIPTION OF A PREFERRED EMBODIMENT OF THE INVENTION

Referring now to the drawings, and more particularly to FIG. 1, there is shown, in highly schematic form, a transducer circuit including signal processing circuitry in accordance with a preferred embodiment of the invention. The transducer arrangement is preferably embodied as a group of four strain gauges arranged in pairs 11E, 11W and 11N, 11S affixed to the lateral sides of an upstanding rectangular prism 28 of slightly flexible material affixed to a base 27 to form a small joystick as shown in plan view in FIG. 2 and in perspective view in FIG. 4. The material should preferably feel rigid to the user who should feel little, if any, motion as the user applies force thereto but must flex adequately to cause some distortion of the strain gauges at comfortable levels of force. This structure is particularly useful in and appropriate to an isometric joystick of the sort commercially available and commonly referred to as a "pointing stick". However, it is to be understood that the nature of the transducers and their mechanical arrangement are not important to the practice of the invention and the arrangement shown in FIG. 2 is to be considered both exemplary and schematic.

The strain gauges themselves are preferably of the metal foil type which is commercially available from several sources and well-known in the art. Application of force to the strain gauges causes a dimensional change in the conduction path therethrough and thus alters the resistance of each strain gauge in a highly predictable manner also well-understood in the art. In the arrangement shown in FIG. 2, a force applied in the direction of arrow 29 will cause the resistance of transducer 11N to decrease due to compression and the resistance of serially connected transducer 11S to increase due to tension by approximately the same amount so that the series resistance of the pair of transducers remains approximately constant while the voltage at node Y will increase. A similar result would occur with force applied orthogonally to direction 29 (but still in the plane of the page) in regard to transducers 11E and 11W to alter the voltage on node X. Thus, any force vector in the plane of the page of FIG. 2 can be detected by its differential effects on the strain gauges; in this case developing a signal for each pair of strain gauges by a voltage divider action.

An important aspect of the present invention is that the total series resistance of each pair (e.g. 11N, 11S) of strain gauges remains substantially constant as long as the force applied to shaft 28 remains substantially in the plane of the page of FIG. 2. Therefore, the further voltage divider formed by resistor 12 and the pairs of transducers is substantially unaffected.

However, any relative force component applied to shaft 28 perpendicular to the plane of the page will cause dimensional change of all four transducers 11N, 11S, 11E, 11W by applying a component of force in compression to all of them and changing (e.g. decreasing) their resistance. Accordingly, the voltage on node Z may be made to change due to the further voltage divider formed by the pairs of strain gauges and resistor 12.

Referring again to FIG. 1 it is to be noted that the signals indicating the relative force components applied to shaft 28 (whether analog or digital and regardless of the type of transducer employed) are preferably derived as ratios of signals on various nodes X, Y and Z. That is, the force components in the plane of the page are derived from the ratio of the signal value on exemplary node X and/or Y to the signal value on node Z. The force component perpendicular to the page is derived as the ratio of the signal value on node Z to Vcc. In other words, in the exemplary preferred form of the invention, the signal value on node Z is used as a reference voltage for developing signals reflecting the force vector in the plane of the page and Vcc is used as a reference voltage for developing a signal reflecting the force perpendicular to the page (hereinafter referred to as the Z-direction), preferably using a plural channel analog-to-digital (A/D) converter 13 of any known type to increase noise immunity. A/D converter 13 is also preferably gated by a sample clock 17 to provide synchronous sets of force vector output signals x, y and z.

Incidentally, the variation in signals from the strain gauges are quite small and substantial amplification (e.g. about 500 times) is generally required prior to A/D conversion, as is understood by those skilled in the art. This amount of gain also implies that a calibrated reference voltage source should be used as well as other precautions against electrical noise.

The x and y force vector signals are preferably then provided, through switching circuit 15, to a cursor control circuit 24, the details of which are unimportant to the practice of the invention. In accordance with established protocols, the cursor control circuit converts the x, y and s (select) signals into motion messages and transmits them to the CPU. The conventional source of the signal s is a switch, such as a mouse button, which is pressed to indicate a selection. The force vector signals x and y and also preferably z are also, in accordance with the preferred embodiment of the invention, provided to and temporarily stored in buffer 14 of suitable length (e.g. about fifty samples) which provides a first in-first out function synchronized with the sample clock 17 for the x, y, z force vector signals. The buffer 14 is processed by the scanning control 40, when the latter is activated by trigger circuit 22, as described below. The result of this processing is supplied to switching circuit 15, which is also activated by scanning control 40.

The thresholding circuit in accordance with the invention receives the z force component signal from A/D converter 13 and performs signal processing thereon which not only provides discrimination of selection signals (produced by intentionally applying an increased force to the shaft 28 orthogonal to forces used to control cursor location) from ordinary and unintended variation during operation of the graphic input device but also, in combination with buffer 14, provides correction of position to the position specified at the onset of selection and accommodates dragging actions by the user, as alluded to above.

More specifically, intended selection is discriminated by comparing both the amplitude and time-rate of change of amplitude (derived by differentiator circuit 18) of the z signal with a plurality of reference signals, collectively represented by Vref, in comparators 19, 19'. Essentially, this function is that of a filter to distinguish between large and rapid changes in the z value from smaller changes which are normally encountered in manipulating of the pointing device. The reference signals can also be adaptively altered by storage of samples by any of many known techniques as well as filtering, illustration of which is omitted from FIG. 1 in the interest of clarity. The comparators 19, 19' are preferably configured (in the simplest case) to provide a logic level output depending on whether the input is above or below a threshold.

Referring to FIG. 3, exemplary values of z and rate of change of z over time (dz/dt) are plotted as a function of time. The value of z is shown having a fluctuating positive value, indicative of normal force and variation thereof applied by the user in the Z direction in ordinary operation of the graphic input device. The time-rate of change also fluctuates accordingly but at a relatively low level about a zero average value.

Now, assuming at time a the operator has successfully specified a position with the cursor or other display indicia, such as an icon, and wishes to make a selection by applying additional force to the graphic input device in the Z-direction. As shown, such force causes a sharp rise in both z and dz/dt. When both of these values have exceeded respective thresholds 31 and 32, the outputs of comparators 19, 19' will assume the same logical value which is detected by a coincidence circuit depicted as AND gate 21. The output of AND gate 21 is then applied to a toggle circuit 22 such as a set/reset flip-flop which essentially assumes and holds the state to which it is last positively driven. The form of this coincidence circuit is not important to the practice of the invention.

Similarly, the outputs of comparators 19', 19" are combined as depicted at AND gate 21' which has an inverting input for receiving the output of comparator 19'. Comparator 19" applies a negative threshold, depicted at 33 of FIG. 3, to the dz/dt signal. Thus, AND gate 21' develops a logic output to reset toggle circuit 22 when z is below a threshold and rapidly decreasing (dz/dt is negative), as shown to the right of time b in FIG. 3, signifying an intended release of a portion of the force applied in the Z-direction to the graphic input device by the user.

The output of toggle circuit 22 is communicated to scanning control 40 to indicate that a user selection has been discriminated. However, as indicated above, the application or release of force from the graphic input device invariably causes an unintended motion which is also reflected in the x and y signals.

The decision that a selection has occurred which causes setting of toggle circuit 22 occurs at some time after the initiation of the selection action by the user, when the z signal begins to rise. In the interim, a number of motion messages x', y' may have been sent to the CPU 25 through cursor control 24, so that the cursor may have been moved to a position different from that at which the increase in the Z-direction force was initiated and at which location selection was intended. It should be noted that x' and y' are relative motion signals (e.g. a number of increments in either or both coordinate directions) and cursor control circuit 24 has no location information at any time. Therefore, any corrective action must be limited to either detecting and reporting a specified time at which selection occurred and/or a message to reverse the motion which occurred since the time of selection together with selection after that corrective reversal of motion. In the latter case, there is the additional difficulty that the CPU action resulting from motion messages during detection of a selection may not be reversible. For example, if the cursor is at the edge of a screen or window, the motion messages may have been ignored and reversing the motion messages sent to the CPU would result in a positional error. However, this condition is relatively rare and may be tolerable to allow the invention to function with a standard mouse driver. The former alternative is unlikely to generate such an error but implies a need for a special mouse driver. The circuit of FIG. 1 is generic to both alternatives or a combination thereof, depending on the behavior of the scanning control 40, as will be discussed below.

It should be noted that corrective action is taken in a similar manner upon detection of deselection, as well. As long as the user maintains an increased force on the graphic input device in the Z-direction, toggle circuit 22 will remain in the set state and the selection signal continues to be provided to cursor control circuit 24 until toggle circuit 22 is reset in response to a sudden decrease of force in the Z-direction.

At a high level, the function of scanning control 40 is to identify the point in the sequence of stored x, y and z signal samples in buffer 14 at which a user action occurred which caused a change of state of toggle circuit 22 and to control generation of signals x, y and s which will reverse any unintended motion accompanying that action. To accomplish this, whenever the scanning control circuit 40 is activated by a change of state of toggle circuit 22, the scanning control circuit scans the contents of buffer 14 to identify the beginning of the sudden change in the z signal (e.g. the beginning of the rise in dz/dt) and totals the motion occurring after that time. This may be readily accomplished by, for example, simply scanning backward until a relatively stable low value of z is found and outputting the corresponding x and y signals. Alternatively, the motion signals may be accumulated in the scan control circuit 40 and a net corrective motion signal generated. When such a stable low value of z is found and subsequent to the generation of corrective motion signals and transmission thereof to cursor control circuit 24 through switching circuit 15, a selection signal is generated and transmitted to the CPU 25 through cursor control circuit 24.

Alternatively, if cursor control circuit 24 or CPU 25 is arranged to temporarily store a time stamp for each cursor movement command, it is only necessary for the scan control circuit 22 to determine the time of the selection and provide that information to the CPU 25 in order to take appropriate corrective action. In this case, buffer 14 would not be required to contain x and y sample values but storage of equivalent motion commands together with time stamps would be provided in either cursor control circuit 24 or CPU 25. Once the time of onset of selection or deselection is determined, a corrected position can be found by locating the cursor position at a corresponding time. In either case, the onset of the selection is determined by scanning through samples of z values in buffer 14 with comparison or other processing for detection of a stable low z value as described above. While several suitable techniques for determining a corrected cursor location have been described, it should be understood that other suitable techniques will be apparent to those skilled in the art in view of this description of the invention and that the above described techniques are not critical to the practice of the invention but merely preferred variations thereof. For example, in place of the stable z value sought above one might use the point of onset of of a rapid increase in the z force, identified as the intersection of lines of markedly different slope which approximate adjacent sections of a z value-versus-time plot.

It should be noted that the constitution of thresholding circuit 20, as described above, should be considered exemplary and numerous modifications and different signal processing circuitry could be used to accomplish the functions of sensing both the amplitude and rate of change of amplitude of the force applied in the Z-direction and comparing the sensed values against a threshold. Further, it should be noted that the discrimination of an intentional change in force in the Z-direction is not completed until the z signal reaches a predetermined amplitude and a slow increase in force may defeat the above-described discrimination. For this reason, it may be desirable to add a further comparator to sense only force in the Z-direction but at a higher threshold. By the same token, the time for discrimination to be done will vary with the rate of increase of force applied by the operator and the buffer must contain a sufficient number of stages to contain samples over the full range of durations which may result in discrimination of a selection by the user.

In view of the foregoing, it is seen that an arrangement has been provided which allows the omission of a separate sensor or switch for selection but provides reliable separation of position specification and selection functions as well as corrections of unintentional changes of the position specified during selection and deselection. The arrangement and method fully supports image manipulation functions which include change of specified cursor location during selection, such as for "dragging".

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A graphic input arrangement including
   a cursor control means,
   a graphic input means including means for developing first, second and third respective signals, at least two of said first, second and third respective signals representing forces applied to a graphic input device along orthogonal axes, and supplying said at least two of said first, second and third signals to said cursor control means,
   storing means for storing at least one of said first, second and third signals,
   filter means for discriminating a force applied to said graphic input device corresponding to a selection, and
   means responsive to said filter means for developing a position correction signal corresponding to at least one of said first, second and third signals stored in said storage means to relocate a cursor at a location where said cursor was located at a time when said force corresponding to a selection was begun.

2. An arrangement as recited in claim 1, wherein said filter means comprises
   comparison means including
      first comparison means for comparing an amplitude of said at least one of said first, second and third signals to a reference value and providing a first output,
      second comparison means for comparing a rate of change of amplitude of said at least one of said first, second and third signals to a reference value and providing a second output,
   means responsive to said first and second comparison means for supplying correction values based on values stored in said storing means to said cursor control means.

3. An arrangement as recited in claim 2, further including a toggle circuit responsive to said comparison means.

4. An arrangement as recited in claim 3, further including means for detecting a change in an output of said toggle circuit and controlling said means for supplying correction values based on values stored in said storing means to said cursor control means when said output of said toggle circuit changes.

5. An arrangement as recited in claim 2, wherein said second comparison means includes
   a first threshold means for detecting when said rate of change of amplitude exceeds a positive value, and a second threshold means for detecting when said rate of change of amplitude falls below a negative value.

6. An arrangement as recited in claim 4, wherein said second comparison means includes a first threshold means for detecting when said rate of change of amplitude exceeds a positive value, and a second threshold means for detecting when said rate of change of amplitude falls below a negative value.

7. An arrangement as recited in claim 6, wherein said toggle circuit is set in response to said first comparison means and said first threshold means and reset in response to said first comparison means and said second threshold means.

8. An arrangement as recited in claim 2, wherein said graphic input means is an isometric joystick.

9. An arrangement as recited in claim 4, wherein said graphic input means is an isometric joystick.

10. An arrangement as recited in claim 6, wherein said graphic input means is an isometric joystick.

11. An arrangement as recited in claim 7, wherein said graphic input means is an isometric joystick.

12. An arrangement as recited in claim 1, wherein said first, second and third respective signals represent forces applied to said graphic input means in three mutually orthogonal directions.

13. A method of controlling an image on a display including the steps of storing samples of an output of a graphic input means, discriminating occurrences of selection and deselection of a location with a graphic input means, and determining onset of force applied to said graphic input means discriminated as a selection by said discriminating step, generating corrections to said output of said graphic input means corresponding to a stored sample of an output of said graphic input means at a time of onset of selection discriminated in said discriminating step.

14. A method as recited in claim 13, wherein said discriminating step includes the further steps of comparing an output of said graphic input means with a first threshold, and comparing a rate of change of an output of said graphic input means with at least a second threshold.

15. A method as recited in claim 14, wherein said discriminating step further includes the step of comparing a rate of change of an output of said graphic input means with at least a third threshold.

16. A method as recited in claim 15, including the further steps of setting a toggle in response to said comparing step wherein said rate of change of an output of said graphic input means is compared with said second threshold, and resetting a toggle in response to said comparing step wherein said rate of change of an output of said graphic input means is compared with said third threshold.

17. A method as recited in claim 16, wherein said discriminating step detects at least one of said setting and said resetting of said toggle.

18. A method as recited in claim 13, including the further steps of supplying a select signal to a data processing means during the period from discrimination of a selection until the discrimination of a deselection.

19. A method as recited in claim 13, including the further step of supplying at least one output of said graphic input means to a data processing means between occurrences of selection and deselection.

* * * * *